United States Patent
Kraft et al.

(10) Patent No.: US 7,429,082 B2
(45) Date of Patent: Sep. 30, 2008

(54) VEHICLE SEAT WITH A PIVOTALLY INSTALLED HEADREST

(75) Inventors: Dieter Kraft, Langenaltheim (DE); Jürgen Hofmockel, Ansbach (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 365 days.

(21) Appl. No.: 11/084,995

(22) Filed: Mar. 21, 2005

(65) Prior Publication Data

US 2007/0001500 A1 Jan. 4, 2007

(30) Foreign Application Priority Data

Mar. 19, 2004 (DE) .................. 10 2004 014 133

(51) Int. Cl.
*A47C 1/10* (2006.01)
(52) U.S. Cl. .................. 297/408; 297/403; 297/391
(58) Field of Classification Search ............... 297/408, 297/403, 391
See application file for complete search history.

(56) References Cited

U.S. PATENT DOCUMENTS

| | | | | |
|---|---|---|---|---|
| 3,186,763 A | * | 6/1965 | Ferrara | 297/410 |
| 3,603,642 A | * | 9/1971 | Laessker | 297/408 |
| 4,111,483 A | | 9/1978 | Jaeger | |
| 4,111,484 A | | 9/1978 | Jaeger | |
| 4,128,274 A | | 12/1978 | Schmedemann | |
| 4,545,618 A | | 10/1985 | Kitamura | |
| 4,600,240 A | * | 7/1986 | Suman et al. | 297/408 |
| 4,639,041 A | | 1/1987 | Furukawa | |
| 4,678,232 A | | 7/1987 | Ishida et al. | |
| 5,108,150 A | | 4/1992 | Stas et al. | |
| 5,110,185 A | | 5/1992 | Schmutz et al. | |
| 5,397,170 A | | 3/1995 | Shrock | |
| 5,474,358 A | | 12/1995 | Maeyaert | |
| 5,484,189 A | | 1/1996 | Patterson | |
| 5,590,933 A | * | 1/1997 | Andersson | 297/408 |
| 5,651,584 A | | 7/1997 | Chenot et al. | |
| 5,775,777 A | | 7/1998 | Delling | |
| 5,860,703 A | | 1/1999 | Courtois et al. | |
| 6,022,078 A | | 2/2000 | Chang | |

(Continued)

FOREIGN PATENT DOCUMENTS

DE 3545142 A1 6/1987

(Continued)

OTHER PUBLICATIONS

European Search Report dated Nov. 8, 2005 for application EP 05 00 6119.

(Continued)

*Primary Examiner*—Laurie K Cranmer
(74) *Attorney, Agent, or Firm*—Dority & Manning, P.A.

(57) ABSTRACT

A vehicle seat with a headrest for a vehicle is formed from an impact cushion and installed upon a seat back. The headrest is pivoted around a stationary pivotal axle aligned transversely to a longitudinal axis of the vehicle and can be swung from an unused position against the force of a spring into a used position. In the used position, the headrest is held stationary by a toggle linkage, which, within its self-limiting swing zone, acts as a pivoting element between the impact cushion and the pivotal axle.

14 Claims, 9 Drawing Sheets

U.S. PATENT DOCUMENTS

| | | | |
|---|---|---|---|
| 6,074,011 A * | 6/2000 | Ptak et al. | 297/408 |
| 6,152,531 A | 11/2000 | Deceuninck | |
| 6,508,512 B2 | 1/2003 | Saberan et al. | |
| 6,612,653 B2 * | 9/2003 | Takata | 297/408 |
| 6,619,739 B2 | 9/2003 | McMillen | |
| 6,666,516 B2 | 12/2003 | Grammss et al. | |
| 6,736,461 B2 | 5/2004 | Blair et al. | |
| 6,796,613 B2 | 9/2004 | Klink et al. | |
| 6,805,411 B2 | 10/2004 | Gramss et al. | |
| 6,824,214 B2 | 11/2004 | McMillen | |
| 6,942,293 B2 | 9/2005 | Kluehspies | |
| 7,165,814 B2 | 1/2007 | Gans et al. | |
| 7,284,793 B2 | 10/2007 | Kluehspies et al. | |
| 2003/0111885 A1 | 6/2003 | McMillen | |
| 2003/0151290 A1 | 8/2003 | Gans et al. | |
| 2005/0023878 A1 | 2/2005 | Kluehspies | |
| 2005/0218708 A1 | 10/2005 | Gramss | |
| 2005/0225144 A1 | 10/2005 | Kluhspies et al. | |
| 2006/0119163 A1 | 6/2006 | Gans et al. | |
| 2006/0163928 A1 | 7/2006 | Droche | |
| 2006/0163929 A1 | 7/2006 | Ebbeskotte et al. | |

FOREIGN PATENT DOCUMENTS

| | | |
|---|---|---|
| DE | 19532260 | 3/1997 |
| DE | 29809175 | 10/1998 |
| DE | 19853624 | 5/2000 |
| DE | 102004038707 | 4/2005 |
| DE | 102004007325 | 9/2005 |
| EP | 0829390 | 3/1998 |
| EP | 0976608 A | 2/2000 |
| EP | 0990555 | 4/2000 |
| EP | 1277612 | 1/2003 |
| EP | 1502808 A2 | 2/2005 |
| EP | 1502809 A2 | 2/2005 |
| EP | 1582400 | 2/2005 |
| EP | 1686004 | 8/2006 |
| EP | 1752334 | 2/2007 |
| JP | 57144135 | 9/1982 |

OTHER PUBLICATIONS

English language translation of European Search Report dated Nov. 8, 2005 for application EP 05 00 6119.
English language abstract for DE 35 45 142 A1 published Jun. 25, 1987.
Abstract of DE 19532260, published Mar. 6, 1997.
Abstract of DE 19853624, published May 25, 2000.
Abstract of DE 102004038707, published Apr. 28, 2005.
Abstract of DE 102004007325, published Sep. 1, 2005.
Abstract of EP 1277612, published Jan. 22, 2003.
Abstract of JP 57144135, published Feb. 14, 2007.

* cited by examiner

VEHICLE SEAT WITH A PIVOTALLY INSTALLED HEADREST

SUMMARY OF THE INVENTION

The invention concerns a vehicle seat, especially designed for motor vehicles, having a seat back. The seat is installed in the rear interior area of the vehicle. In particular, the seat back is furnished with a headrest, shaped similarly to a safety impact cushion, which is set in pivotal bearings. The headrest rotates about an axle running transversely to that of the direction of travel, embracing an arc between a used position and an unused position. The unused position does not obstruct the line of sight above the seat back. So that the headrest can be held in its unused position without wobble or swinging motions, a spring has been provided to secure the headrest by its force. To assure a secure positioning, even in a case of extreme driving conditions, such as travel over an uneven driving path, a correspondingly great spring force is required. If the headrest is pivoted out of the used position into the unused position, then this must be carried out against the force of the spring. Accordingly, in the used position, a locking of the headrest is necessary. This is normally accomplished by a torque based closure between the axle, which governs the pivoting between seatback and the head rest acting as an impact cushion.

Due to the spring force acting in a direction toward the unused position, the coacting components generate a substantial friction resistance in the concept of a torque closure. On this account, a considerable activation force is necessary for the freeing of the headrest, or in other words, for the release of the torque closure. This leads to a situation in which the torque closure must be made reliable in such a manner, that under collision circumstances it does not release itself and allow the headrest to swing into its unused position at the moment of impact.

Accordingly, the invention is generally directed to a vehicle seat with a pivotal headrest, which, in its used position and under extreme conditions is prevented from swinging into its unused position by being securely restrained but nevertheless, can be easily disengaged from the restraint.

This purpose is achieved by a vehicle seat having a headrest constructed as described in detail below. In the impact cushion thereof, a toggle type linkage is furnished, which consists of two, swingable, lever arms, which are bound together to form a double throw knee action and are located in a plane, which is transverse to the plane of the pivotal axle of the headrest. A first end of the toggle linkage is radially remote from the pivotal axle and is rotationally affixed to an axle, which is stationarily bound within the impact cushion. For the locking of the used position of the headrest, the toggle linkage maintains a torque resisting closure between the impact cushion and the pivotal axle. With this arrangement, the positioning of the lever arms, one to the other, is assured by a positioning element located in the impact cushion. A toggle linkage in an extended, or nearly extended position, can exhibit a great resistance against forces acting in the direction of the joining line between it two ends. With this in view, secure headrest retention is assured even under circumstances of high inertial impacts caused by collisions. The presupposition for this is that the lever arms retain their counterpoised alignment, which, in accord with the invention, is made certain by the positioning element.

The force, which acts transverse to the above mentioned joining line of the toggle linkages is several times less than the force of the spring acting in the direction of the joining line. A counter measure to the positioning element of a motion of the lever arms for the purpose of unlocking on this account, is possible in the toggle linkage area with little expenditure of force.

Securing the headrest placement in its used position can be carried out by a toggle linkage extended to a straight line. Advantageously, however, for the locking of the used position, a toggle linkage has been installed, which can be so extended or relaxed therefrom. In the case of the first alternative, the lever arms close an angle of >180° on their sides remote from their area of motion. In order to fix this position, an abutment is provided, which is placed on the stated side and which coacts with a lever arm in the area of the toggle linkage. In the case of a loading of the toggle linkage, possibly by the spring, the spring is subjected to a lever arm on the opposite bearing and is thereby fixed as to position. Even more advantageously, the abutment is positioned in the area of the toggle linkage, since at that location, as has already been explained, the transverse forces which influence the toggle linkage, are at their minimum. For the unlocking operation, the toggle linkage must be swung out of its dead point, straight-line situation into an extended position, wherein its lever arms close to an angle <180° on that side remote from its toggle swing zone. Because of the spring force, which is present at its ends, the toggle linkage folds together, whereby the spring moves the headrest to its unused position. For the purpose of unlocking the used position, a release element is furnished, whereby the angular positioning of the lever arms can be changed to an angle of <180°. When this angle is established, then the toggle linkage retracts because of the removal of the swing-blocking agent between the impact cushion and the pivotal axle. Advantageously, the positioning element is an abutment located on that side of the toggle linkage remote from its swing zone. This abutment also serves as a release element.

In the case of a particularly favorable embodiment, this abutment is a crossbar with an inclined surface at one end and is in a location transverse to the longitudinal axis of the vehicle. The abutment is movable and placed within the headrest. With its inclined surface, the abutment coacts with a specifically located, complementary inclined surface of a lever arm in the manner of wedge displacement. Even in this case, it is of advantage, because of the small exertion of force, if the loading of the toggle linkage is done in the area of its central knee joint.

In a particularly advantageous embodiment, the second end of the toggle linkage is bound in a linkage arrangement with a pawl, which is rigidly bound to an axle, which runs transversely to the longitudinal axis of the vehicle. The pawl is connected to the impact cushion to allow a blocking position and a release position. In the blocking position, a pivoting blocking agent functions between the pawl and the pivotal axle. To move the headrest, this blocking agent can be released. The toggle linkage, as is the case with the first embodiment example, is over-extended for the fixation of the used position of the headrest. The pivot blockage is advantageously attained, in that on that side of the pawl which faces the pivotal axle, a recess is available into which, during a blocking action, a projecting cam on the circumferential surface of the pivotal axle penetrates. In this case, the toggle linkage acts only indirectly counter to a relative pivoting of the headrest about the pivotal axle.

In another favorable embodiment, the second end of the toggle linkage acts again indirectly upon the pivotal axle. This is due to the fact, that the second end supports itself on a link, which extends itself from the pivotal axle and is non-rotatably affixed thereto.

During a time in which the previously described variants of the impact cushion are retained in their used position by an over-extended toggle linkage, in a further advantageous embodiment, this is done in an alternate method by an under-extended toggle linkage. The lever arms in this aspect of the invention close an angle of <180° on their side, which is remote from their swing zone. Even in this case, the side-by-side aligned lever arms are secured in place by a positioning element, which can be installed on an optional side of the toggle linkage. In accord with which side of the toggle linkage the positioning element may be found, it is subjected to either compression or tension. A release element, which carries the toggle linkage over its dead point, in this case, is not required.

In order to make possible a closure of the toggle linkage, and therewith an unlocking of the headrest, it is principally necessary, that the location-fixation applied to the lever arms be released by the positioning element. The positioning element is advantageously a pawl, extending itself into the swing zone of the lever arms. The pawl coacts with a lever arm proximal to the knee joint of the toggle linkage. The arm of the pawl, for the unlocking of the used position of the headrest, is rotated out of the swing zone of the lever arms. In a particularly favorable embodiment, the positioning element is a pawl extending its arm into the swing zone of the toggle linkage, with one end on a axle so as to be swingable between a locking and an opening position and in a locking position engages a hook, which is located on its free end, into a complementary opening on a lever arm provided in an area proximal to the knee joint of the toggle linkage. When the pawl arm is pivoted into a release position, then the hook disengages and the arm places itself outside of the swing zone of the lever arm. It will be appreciated that such a hooked pawl could also be located on that side of the toggle linkage which is remote from the pivoting path.

In order to be assured, even in extreme situations, that the toggle linkage can properly maintain its position in a torque closure between the impact cushion and the pivotal axle, it is pretensioned in the direction of this position by a spring.

If the fixation of a headrest on a seat back should not be made with vertically running support rods, but rather with the aid of a pivotal axle in a recess in the under part of the headrest, then the total assembly can be simplified if the pivotal axle possesses two parts. The two parts in this aspect are movable in relation to one another and respectively extend themselves out of the impact cushion. One part acts against the force of a spring and is slidable relative to the impact cushion so that its extension is at least minimized. In this situation, it is possible that the headrest inserts itself into a recess in the seat back. Accordingly, the pivotal axle is again lengthened and the corresponding end of the axle engages itself into a bearing. Advantageously, considering the mounting costs of the required number of parts, it is also possible that a helical spring, besides its axial replacement function, can also serve to hold the headrest in its unused position.

BRIEF DESCRIPTION OF THE DRAWINGS

With the aid of the attached drawings, the invention will be explained in greater detail. There is shown in.

DETAILED DESCRIPTION OF THE INVENTION

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Figure 1:
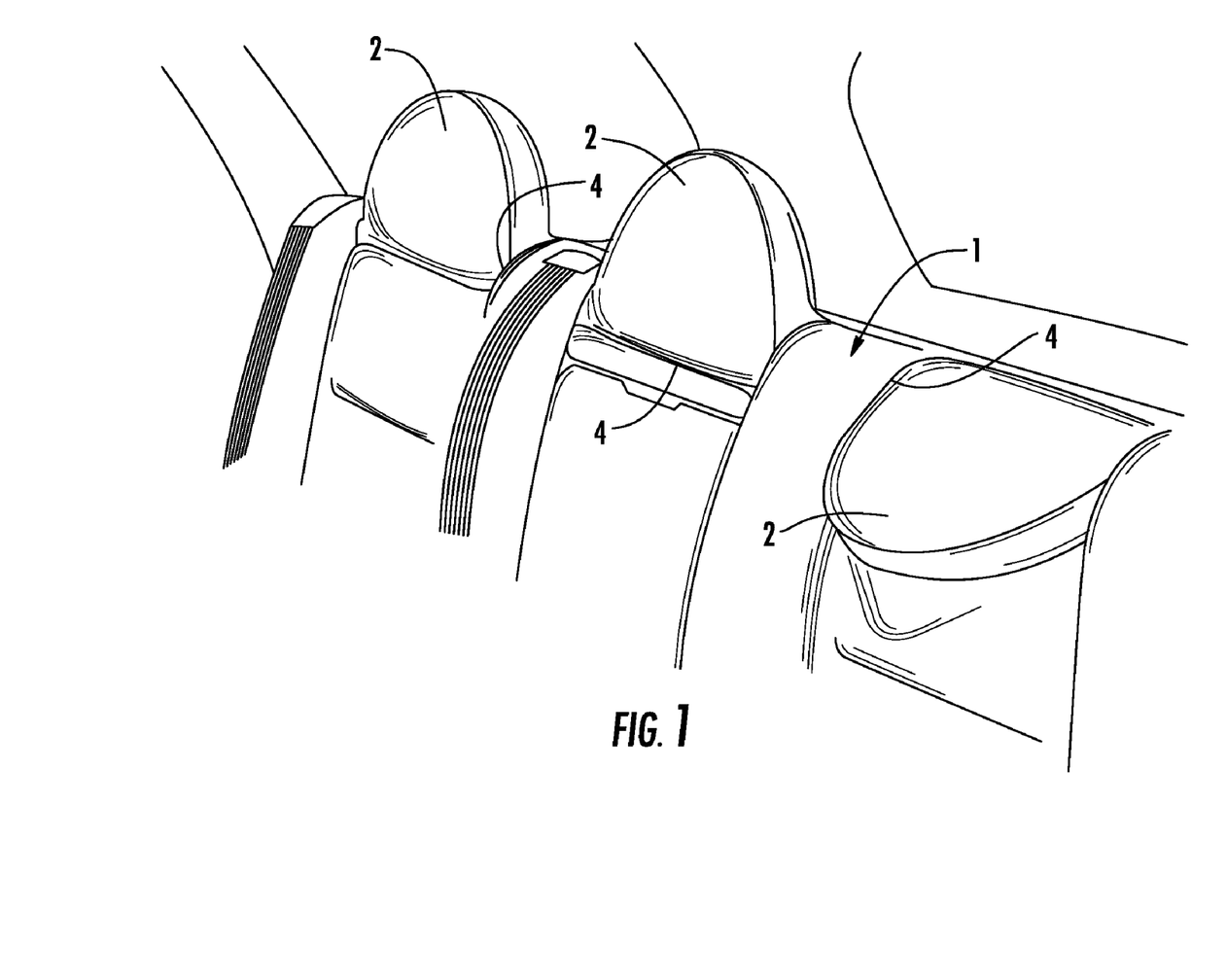
FIG. 1 a back seat array with headrests, which can be down-folded and are aligned along the seat back transversely to the longitudinal axis of the vehicle, FIG. 2 a first embodiment of a headrest, in a partial cross section, perspective presentation in which the position is fixed in the "used" placement by an outstretched toggle linkage, FIG. 3 a folding mechanism as in FIG. 2, shown in a perspective view, FIG. 4 a schematic section view, which shows a headrest in its "used" placement, FIG. 5 the headrest of FIG. 4 in the down-folded, unused position, FIG. 6 a partial schematic side view of a second embodiment of a headrest in the used position, FIG. 7 the headrest of FIG. 6 in its unused position, FIG. 8 a third embodiment of a headrest in the used position, and FIG. 9 the head rest of FIG. 8 in the folded down, unused position.
Figure 2:
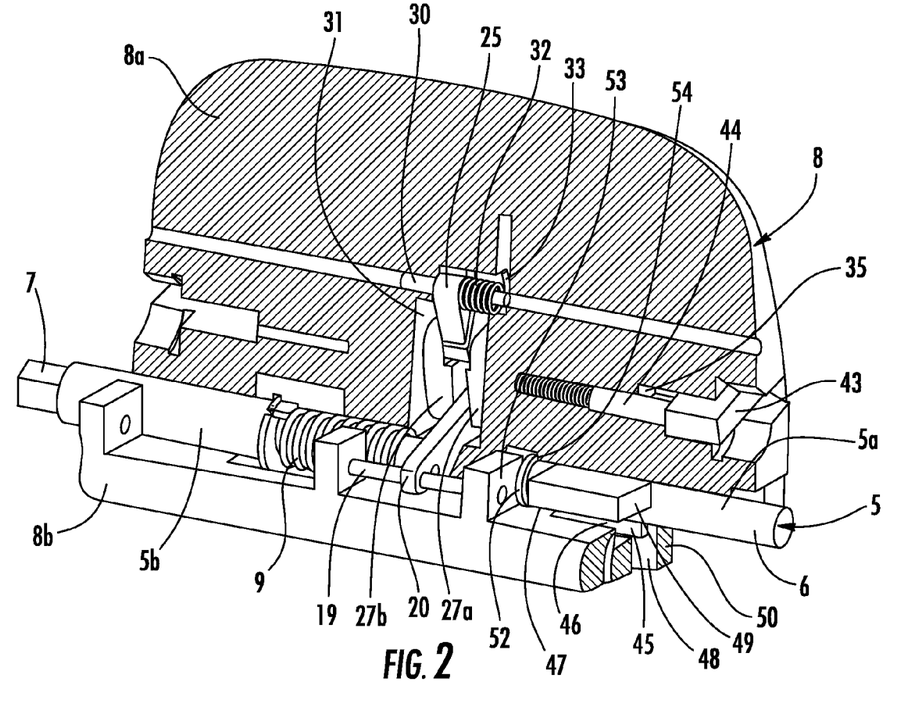

FIG. 1 generally shows a back seat area of a motor vehicle (not shown) with inclined seat backs. In this example an array of seat backs 1 total three headrests 2. These headrests 2 pivot about an axle 5 (see arrow in FIG. 3), which runs in a direction 3 that is transverse to the longitudinal axis of the vehicle. The lower part of a headrest 2 fits into a complementary recess 4 in the upper part of a seat back.

The pivoted flap mechanism for a headrest 2, as detailed in FIGS. 2-5, encompasses the pivot axle 5 briefly introduced above. This axle 5 is secured in that the ends thereof protrude laterally beyond the head rests 2 into an area of the recess 4 where they are received in complementary elements of a carrying construction (not shown). The pivotal axle 5 penetrates the impact cushions 8 (FIG. 2), which are essentially part of the head rests 2. Each of the impact cushions 8 consists of two halves, which are affixed together by an adhesive, thus forming one rear partial impact cushion 8a and a forward partial impact cushion 8b.

Figure 5:
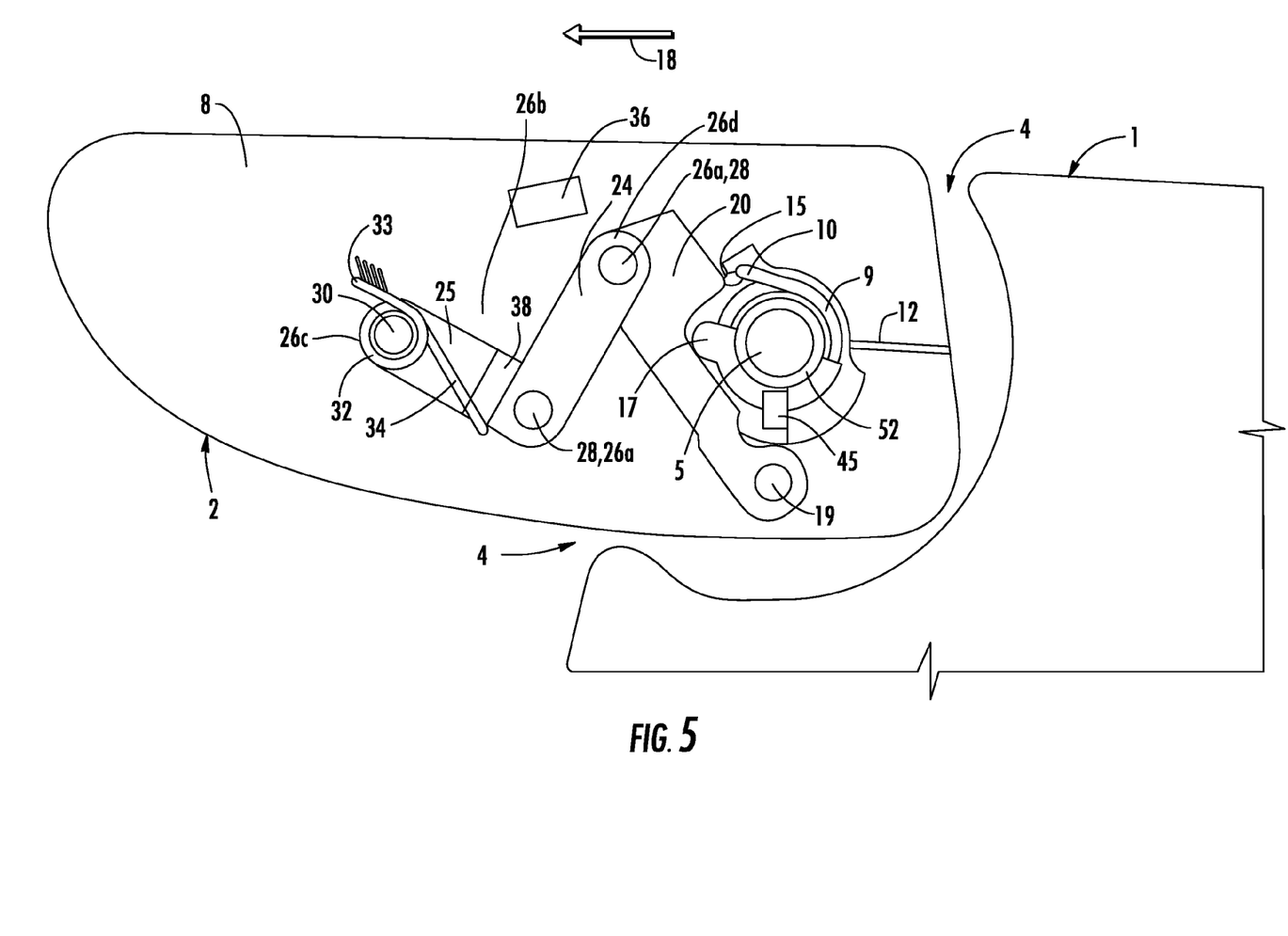

A head rest 2 is placed by spring action into its resting or unused position (see FIG. 1, rightmost headrest 2 and FIG. 5). The spring force emanates from a helical spring 9, which circumferentially encloses the pivotal axle 5 on a general longitudinal section. The one spring end 10 of the helical spring 9 is rigidly affixed to the pivot axle 5 to secure the axle 5 non-rotably in the seat back 1. The second end 12 of the helical spring 9 extends itself away from the pivotal axle 5 and is embedded in the impact cushion 8. That is to say, the spring end 12 of the helical spring 9 protrudes into an available recess in the impact cushion 8.

The helical spring 9 is so pretensioned that its spring end 12, when the headrest 2 is in the unused position (see FIG. 5), loads that section of the impact cushion 8, which extends itself counter to the direction of travel 18 away from the pivotal axle 5, essentially with an upward directed force. The helical spring 9 is so installed that a wobbling of the headrest 2 in the unused position is prevented during the operation of the vehicle. The rigid fixation of the pivotal axle 5 in the seat back is assured by a polygonal formation of its end 7.

In order to enable, or to ease, an insertion of the headrest 2 into a recess 4 of the seat back 1, the pivotal axle 5 is made of two movable components, which are axially aligned with each other. These are respectively called casing 5a and casing 5b since they essentially form an outer shell. The casing 5b is attached to that end section of the axle rod 5a which extends itself to the left in FIGS. 2, 3 and is fixed to be nonrotatable in its attached location. The outer end of the casing 5b forms that end of the pivotal axle 5, the inner end of which axle 5 carries a flange segment 14, which radially extends itself beyond the circumference of the casing. This flange segment 14 possesses a radially excised slot 15, into which the end 10 of the helical spring 9 engages. For the insertion of a headrest in a recess 4 of a seat back 1, the pivotal axle 5 is shortened, since the casing 5a in the direction of the arrow 16 (FIG. 3) is under compression by the helical spring 9 and on this account is pushed into the impact cushion 8. The protruding end 6, being extended out of the head rest 2, engages a complementary bearing opening (not shown) within the recess 4 and the headrest 2 is brought into its specified position. In this specified position of the headrest 2, the helical spring 9 pushes the casing 5a again outward such that the polygonal end 7 engages itself in a complementary shaped bearing cavity (not shown) in the back of the seat. The helical spring 9 thus fulfills two functions, these being, first, an axial replacement and second, assures the fixation of the headrest 2 in its unused position.

Figure 3:
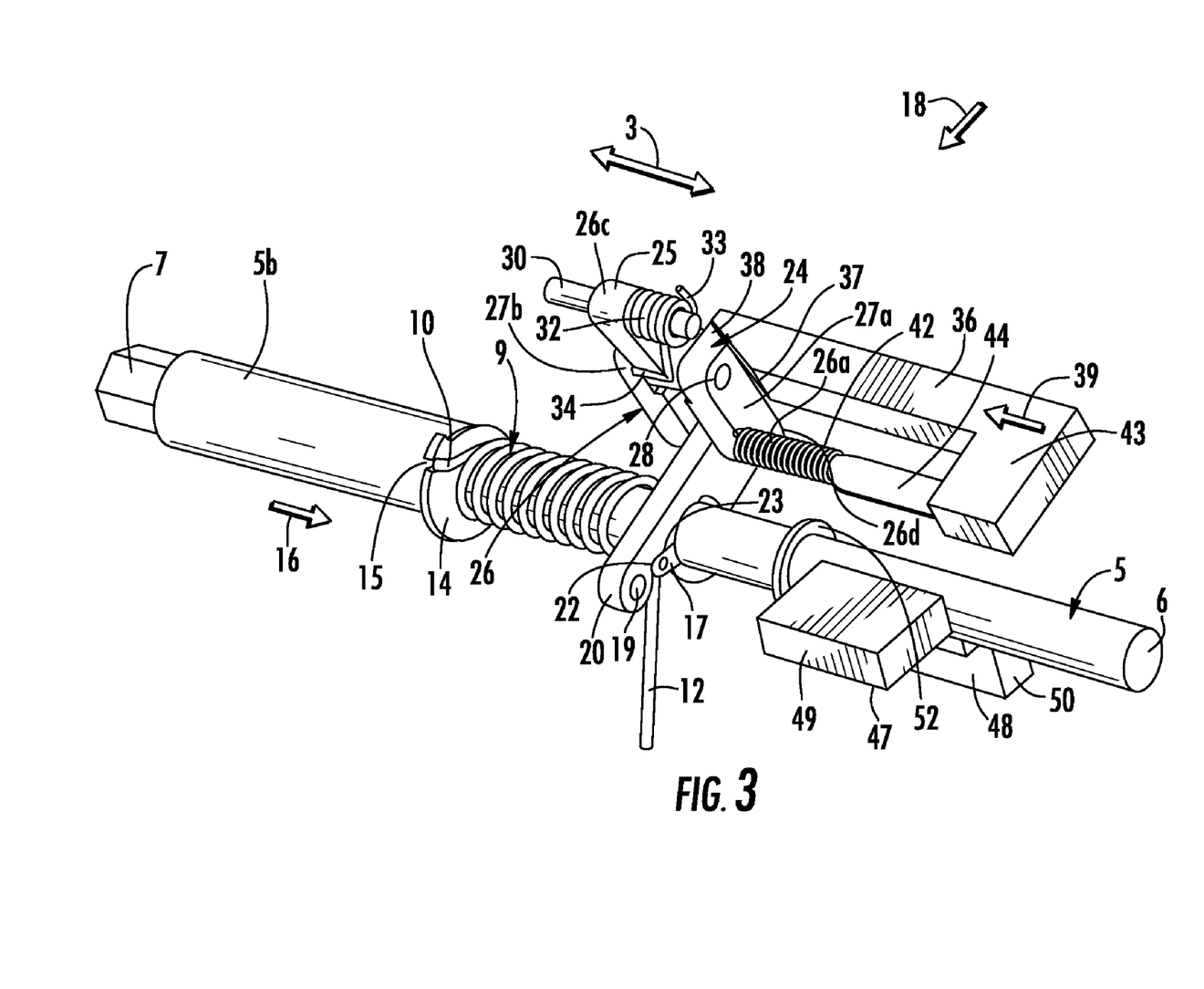
Figure 4:
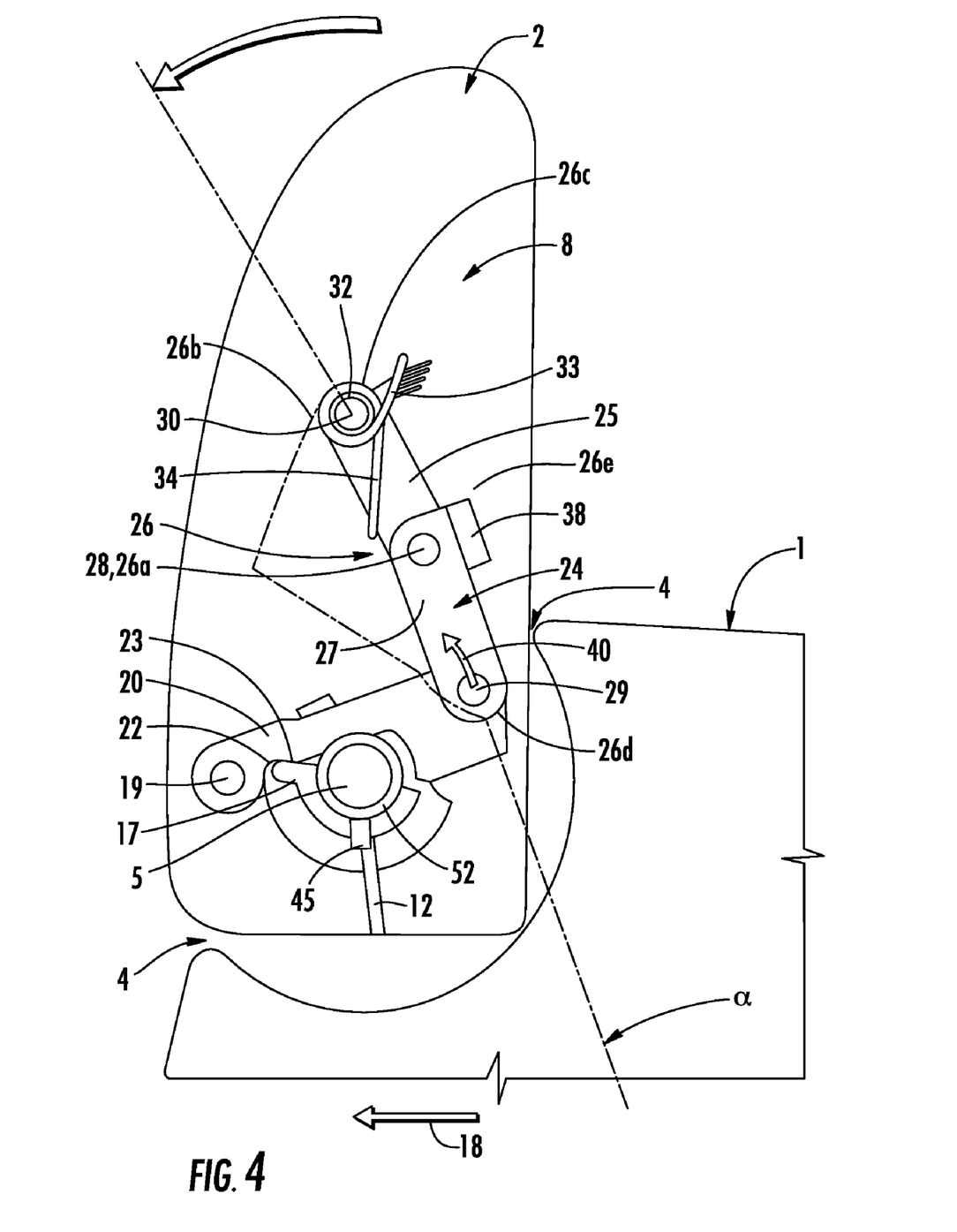

For the placement of the headrest 2 in its used position, the following procedure is to be followed:

On the extended end 12 of the helical spring 9, and on that side of the pivotal axle 5 which faces in the direction of vehicle travel 18 as shown in FIG. 3, is to be found a radially protruding cam 17, possibly cast or otherwise formed thereon. Within the radial separating distance to the cam 17 is rigidly fixed in a cushion part 8b a non-rotating axle 19, which extends itself in a direction 3 transverse to the longitudinal axis of the vehicle. Attached onto this axle 19 is a pawl arm 20, the end of which can pivot. The pawl arm 20 extends itself in the direction of travel 18 and above the pivotal axle 5. On the underside of the pawl arm 20, which is proximal to the pivotal axle 5, is located a recess 22, which is designed to receive the cam 17. The cam 17 lies, in this service, on an edge 23 of the recess 22. The edge 23 serves as a detent. As shown in FIGS. 3 and 4, the pawl arm 20 is retained in position by a toggle linkage 26, which is in the extended condition and consists of two lever arms 24, 25. In this positioning, the lever arms 24, 25 act to move their sides 26e, which are remote from the pivoting area, through an angle a, which is slightly greater than 180°. The lever arm 24 consists of a pair of separate arms 27a, 27b. These arms 27a, 27b and 25 are bound together by an axle 28, which runs in a direction 3, transversely to the longitudinal axis of the vehicle. In this arrangement, the end of the lever arm 25, which is penetrated by the axle 28 is abutted by the arms 27a,b of the lever arm 24. Those ends of the arms 27a,b, which are remote from the axle 28, capture that end of the pawl arm 20, which is remote from the axle 19, between them. Further, the ends of the arms 27a,b are pivotally bound together with the pawl arm 20 by the axle 29. The axles 28 and 29 are not fixed in the impact cushion 8, but quite differently, are located in a hollow space 31 (FIG. 2) of the impact cushion 8. This allows the axles 28, 29 to move freely upon a folding down (or up) of the headrest 2 in a similar manner to pawl arm 20 and the lever arms 24, 25. The outer end of the lever arm 25 is supported in a rotating manner on an axle 30, which is stationarily fixed within the impact cushion 8. The self-limiting extension of the toggle linkage 26 is assured by a spiral arm-spring 32, which possesses two extended end pieces 33, 34 and also circumferentially encompasses the axle 30. The one spring end 33 is stationarily affixed within the impact cushion, while the other spring end 34 loads the lever arm 25 on the side of the toggle swing zone 26b (see FIG. 5).

So that the headrest 2 can be swung out of its used position into its unused position, in accord with FIG. 5, it is necessary that the dead point of the toggle linkage 26 be avoided. In a recess 35 of the cushion part 8a (FIG. 2) a movable crossbar 36, which is aligned transversely to the direction of travel, is introduced to serve this purpose. The crossbar 36 also functions as an abutment, on which abutment the toggle linkage 26 lies in the area of the knee joint, namely in area 26a, which allows its fully extended position to be achieved. The inner end of the crossbar 36 possesses an angled surface 37, which matches a complementarily shaped angled surface 38 on that side of the arm 27a, which faces away from the direction of travel 18. This is evident in the right arm 27a of FIG. 3, which coacts in the manner of a wedge displacement, so that upon the activation of the crossbar 36 in the direction of the arrow 39, the fully extended position of the toggle linkage 26 is released. As soon as the lever arms 24, 25 attain an angle of α<180°, on that side 26e of the toggle linkage 26, which side is remote from the toggle swing zone 26b, then the headrest 2, that is to say, its impact cushion 8, is swung by the force of the helical spring 9 into the unused position as shown in FIG. 5. When this is done, the toggle linkage 26, so to speak, collapses. The axles 19 and 30 execute as this is done a circular movement about the pivotal axle 5 while the movement paths of the axles 28, 29, because of a superimposition by movement direction components, describe a non-circular travel path. To the extent that the angle α made by the lever arms 24, 25 diminishes, the axle 29 approaches the axle 30 and the pawl arm 20 carries out a swinging movement in the direction of the arrow 40. The result of this is that the cam 17 is no longer embedded in the side edge 23 of the recess 22, so that a pivoting of the impact cushion 8 about the pivotal axle 5 into the unused position (FIG. 5) becomes possible. The return thrust of the crossbar 36 is effected by a helical spring 42, which abuts itself on the one end on the partial impact cushion 8a and the other end supports itself on a broadened end of the crossbar 36, which serves as an activation element 43. Between the activation element 43 and the helical spring 42 is placed a rod 44.

For the limitation of the pivoting swing of the impact cushion 8, on the underside of the casing 5a is formed a somewhat weblike detent 45, which protrudes radially and somewhat vertically from the circumferential surface of the pivotal axle 5. The detent 45 extends itself into a hollow space 46 of the impact cushion 8.

This hollow space 46 is limited in extent by the swinging space allotted to the impact cushion 8 by the detent surfaces 47, 48. These detent surfaces 47, 48 are also the surfaces of elastomer bodies 49, 50, which are embedded in the impact cushion 8. The elastomer bodies 49, 50 bring about, on the one hand, an end bearing damping and otherwise assure that a specified tolerance compensation exists.

The impact cushion 8 is affixed axially to the pivotal axle 5. For this purpose, this carries a flange 52, which is located at a position between the elastomer body 49 and the pawl arm 20. The axial movement of the flange 52, or that of the pivotal axle 5 is limited by detent surfaces 53, 54 present in the partial impact cushions 8a, 8b.

Figure 6:
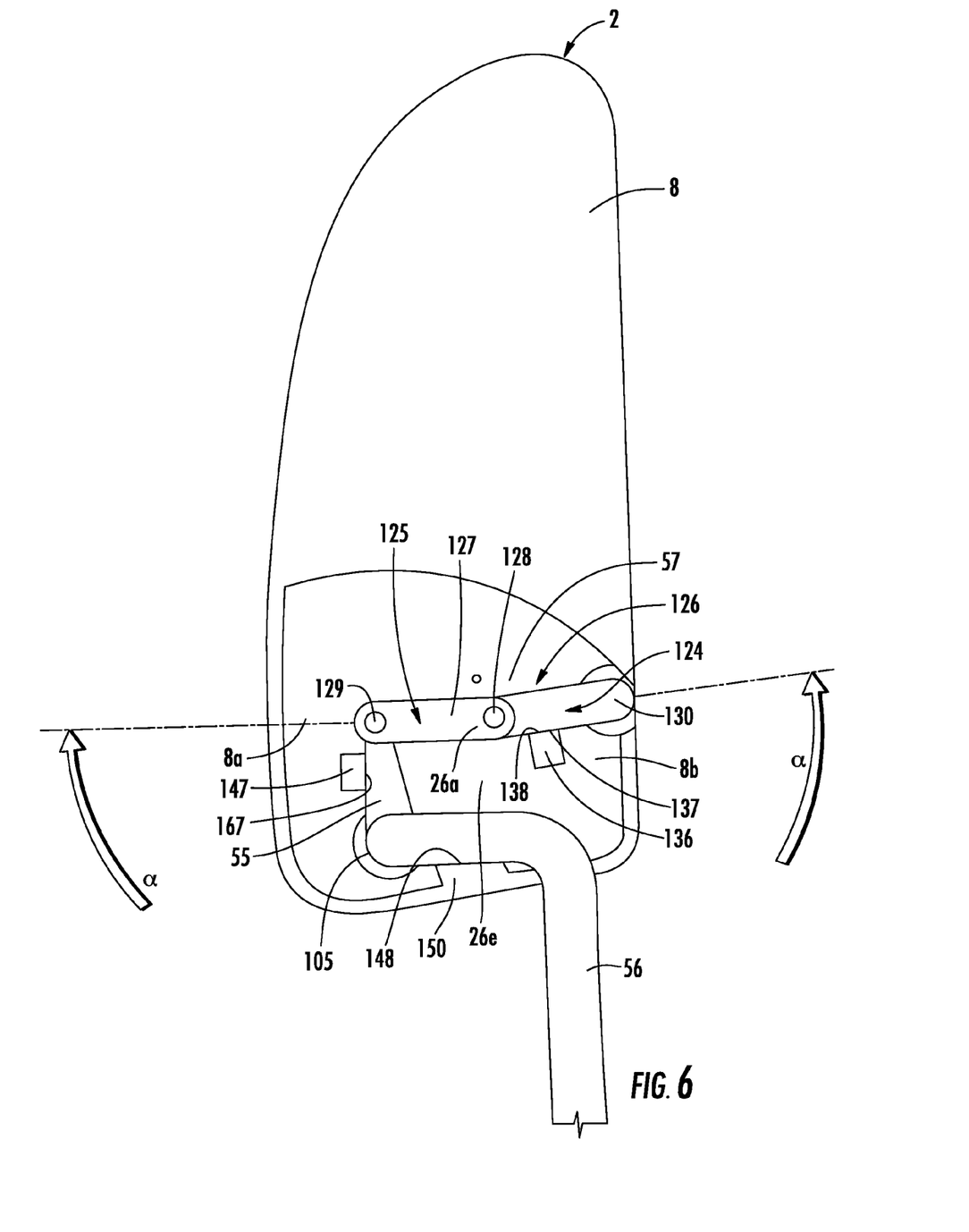
Figure 7:
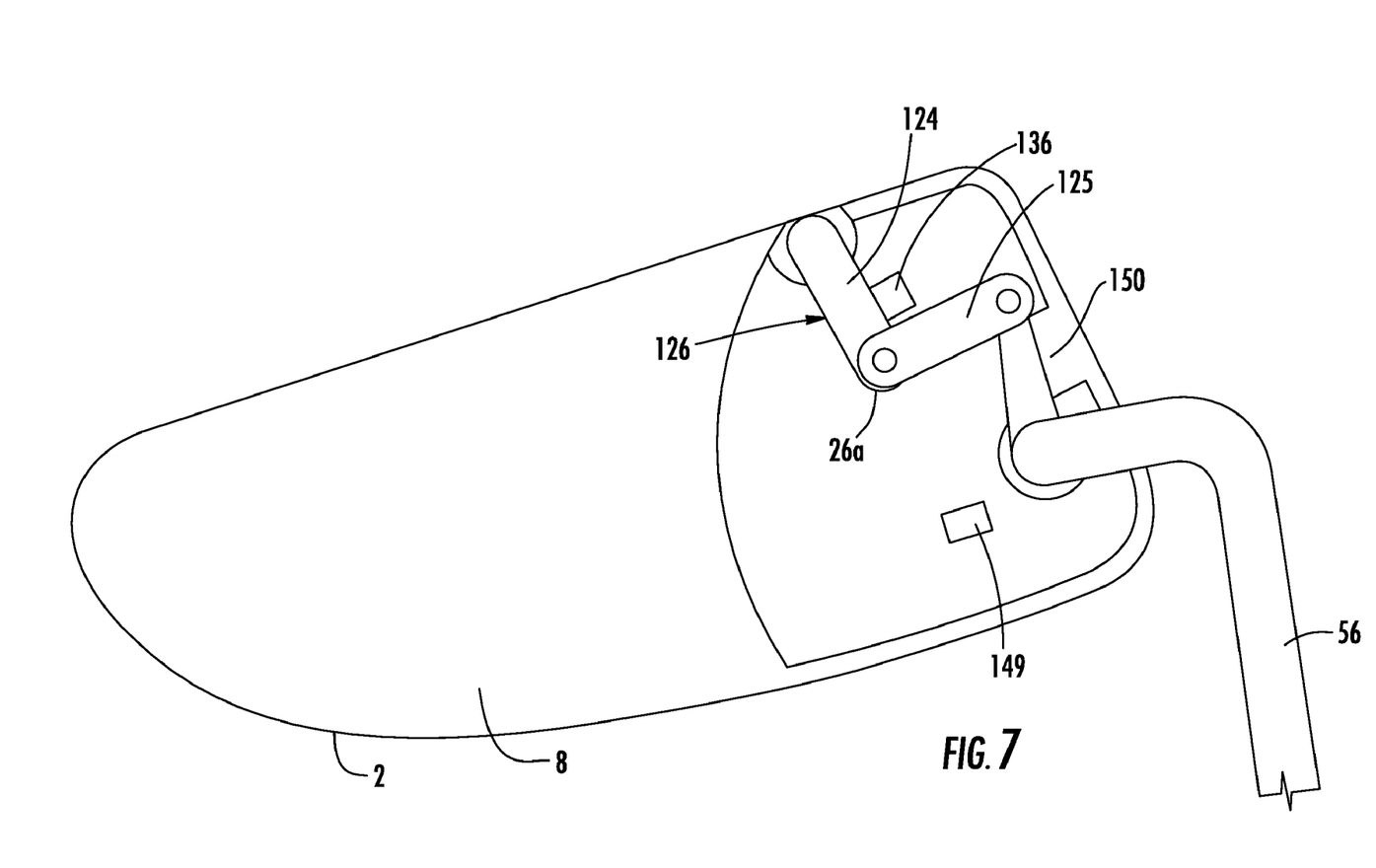

An embodiment is shown in FIGS. 6, 7, wherein the affixing of the headrest 2 in its used position was likewise accomplished by a fully extended toggle linkage 126. However, in this case, the toggle linkage 126, with its second end 26d supports itself on a link 55, which is rotationally fixed at one end to pivotal axle 105. The headrest 2 is held transversely to the direction of travel by two holding rods 56. The holding rods 56 can be axially and slidably displaced in the seat back. The pivotal axle 105 connects the two holding rods 56, that is, so to speak, is bound as one piece with the rods 56. Such a design can also be considered in the case of the embodiment which has been explained above, namely in FIGS. 2 to 5. The impact cushion 8 is pretensioned by a helical spring (not shown). This is carried out in the same manner as the helical spring 9 activates a pretensioning of the impact cushion 8 of the first described embodiment, when cushion 8 is in its unused position.

The assembly of the toggle linkage 126 includes two lever arms 124, 125. The lever arm 125 is formed from two additional arms 127 separated from one another and running in direction 32 transverse to the travel direction of the vehicle. The inner ends of the lever arms 124, 125, which form the knee joint 26a of the toggle linkage 126, are bound together by the axle 128. The arms 127 bind the inner end of the lever arm 124 between them. That end of the lever arm 124, which is remote from the axle 128, is pivotally supported on an axle 130 which is affixed immovably in the impact cushion 8. The outer ends of the lever arm 125 enclose between them the link 55 and are linkedly bound with the link 55 by an axle 129.

The axles 128, 129 and 130 all extend themselves in a direction transverse to the direction of travel of the vehicle. The toggle linkage 126, in its extended position, is subjected to the force of a spring (not shown), similar to the arrangement of the above described first embodiment. In order to overcome the dead-point of the toggle linkage 126, a cross bar 136 has been provided, which possesses an angled surface 137, which matches with a complementary angled surface 138 on the lever arm 124, to act in the concept of a wedge displacement means. In this way, the angled surface 138 is made to approach the knee joint 26a. The end bearing damping for the pivotal motion of the headrest 2 is activated by elastomer bodies 149, 150, which, respectively, coact with a detent surface 147, 148 and with the link 55. The fully extended position of the toggle linkage 126 can additionally be attained by means of a mechanical blockage (not shown), which, for instance, would find itself in the area of the axle 128, approximately in the location 57 in the toggle swing zone 26b. The mechanical blockage is advantageously motion-coupled with the cross bar 136 in such a manner that, upon the overcoming of the fully extended position in accord with FIG. 6, the mechanical blockage absents itself from the toggle swing zone 26b of the lever arms 124, 125.

A similar additional securement could also be considered, in the case of the further above described embodiment. The components of the headrest folding apparatus, upon the pivoting of the headrest, carry out a relative motion into a hollow space 51 provided within the cushion 8.

Figure 8:
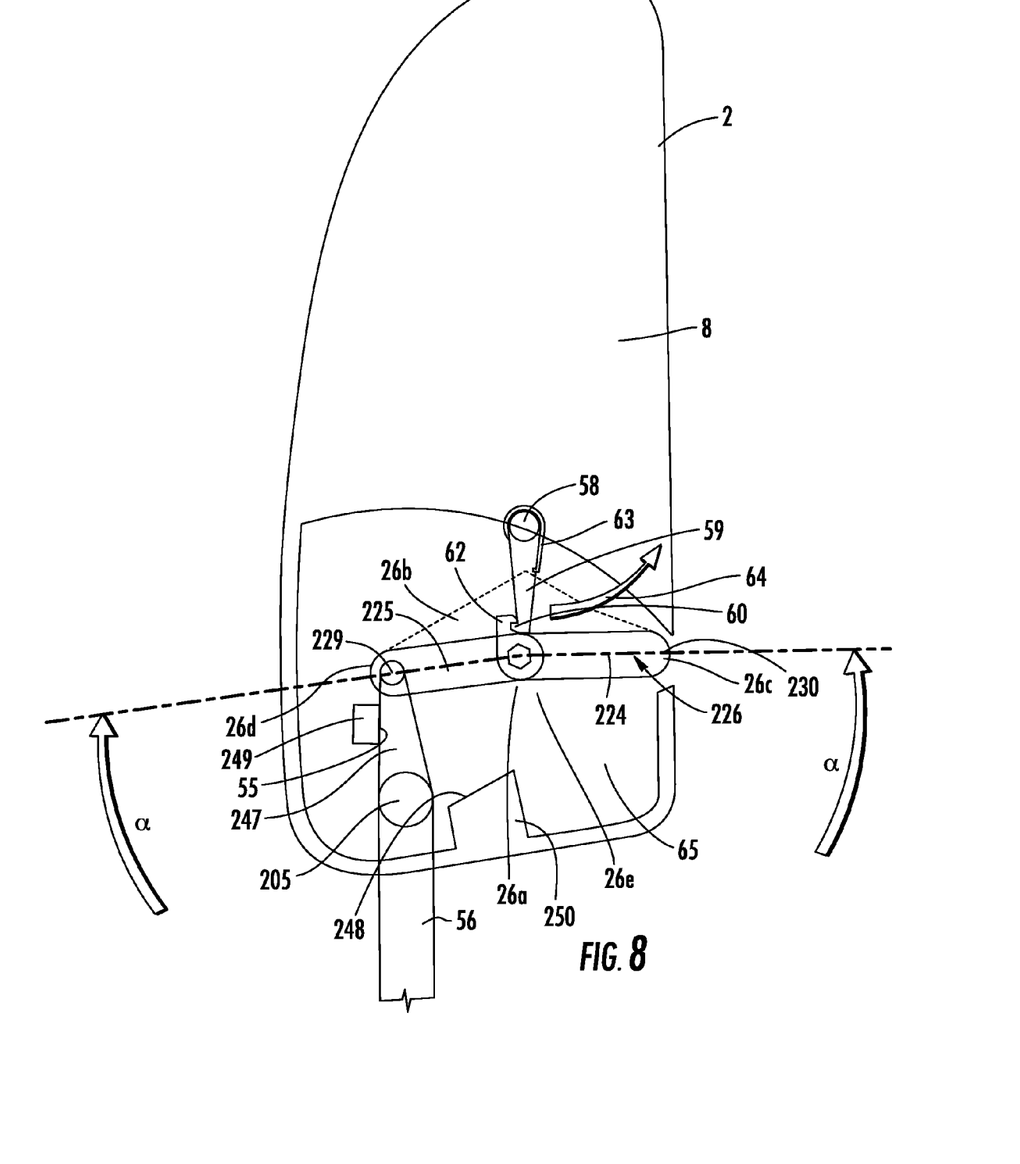
Figure 9:
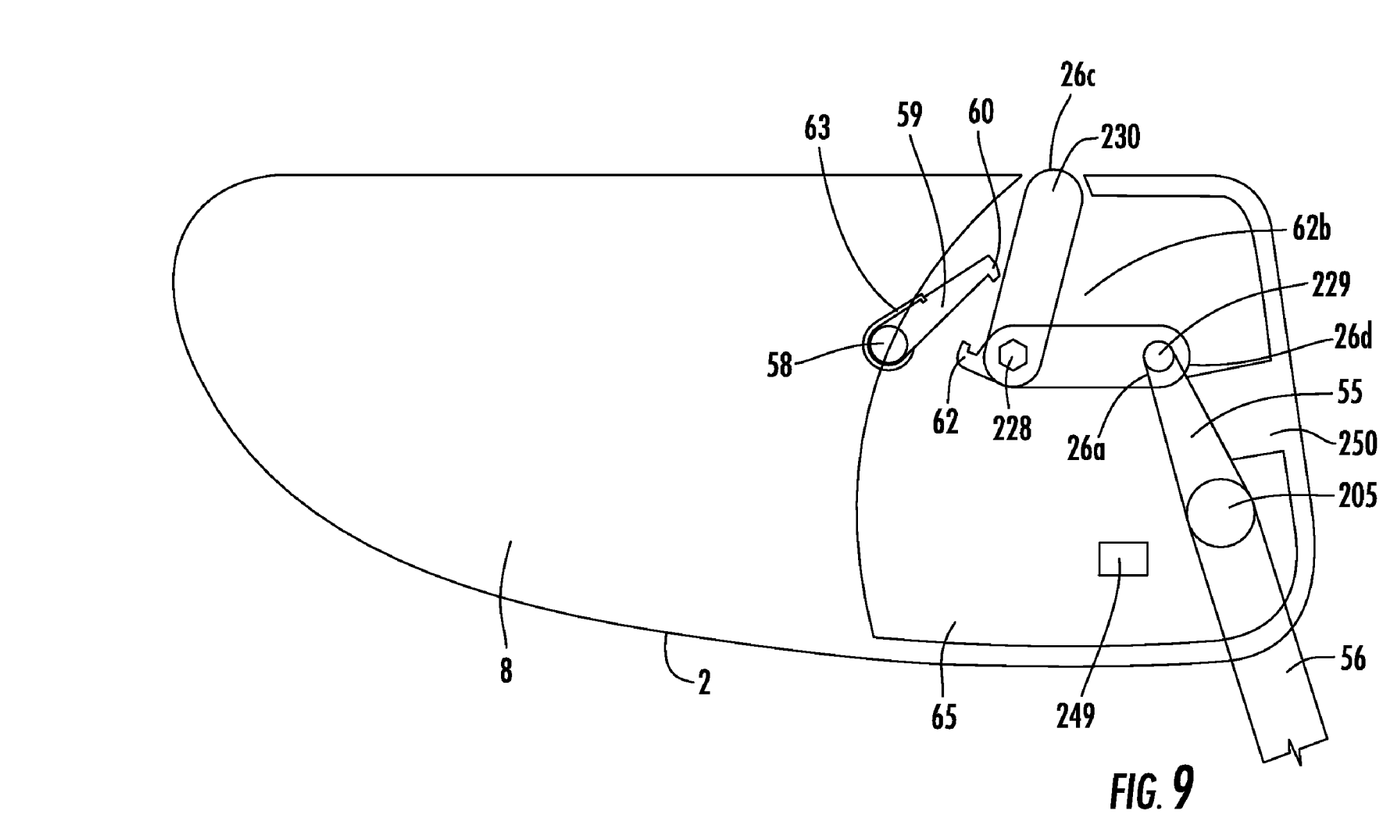

In FIGS. 8, 9 is shown an embodiment in which the headrest 2 is fixed in its used position by a toggle linkage 226 in a less than straight-line orientation. In this exemplary toggle linkage 226, the lever arms 224, 225 close an angle α with the side 26e, which is remote from the swing zone 26b in which angle is less than 180°. The second end of the toggle linkage 126, as is shown in the embodiment depicted in FIGS. 6, 7, is rotationally affixed by an axle 229 to a link 55, which is rigidly affixed to the pivotal axle 205.

The first end 26c of the lever arm 224 is rotationally attached to an axle 230 (see FIG. 9), which is rigidly secured within the impact cushion 8, i.e., within the headrest 2. A spring (not shown), which circumferentially encircles the pivotal axle 205, forces the impact cushion 8 into its unused position.

By spring loading, or by a loading by inertial forces caused by a collision, the toggle linkage 226 is subjected to forces from its ends 26c, 26d. This loading retains the toggle linkage 226 in its position, since this position is fixed by an abutment. The abutment is formed by a pawl 59, which is rotatably secured at one end by an axle 58, and thus supported outside of the swing zone 26b. The free end of the pawl 59 carries a hook 60, which engages itself in a complementary hook 62. The complementary hook 62 is to be found near the knee joint 26a on the lever arm 224. In this position, the pawl 59 is loaded by a bar spring 63. In this way, assurance is given, that even in a case of extreme force application onto the ends 26c, 26d, to toggle linkage 226 retains its less than straight-line posture as is indicated in FIG. 8.

In order to unlock the headrest 2, the pawl 59 is swung to follow the direction of the arrow 64 (FIG. 8), thus removing itself from the toggle swing zone 26b. The torque closure between impact cushion 8 and the pivotal axle 105 is now removed, and the head rest 2 can swing down into its unused position. In this unused position, the pawl 59 lies with its hook 60 to the side on the lever arm 224. Upon rotating the headrest back into its used position, then the pawl, 59, because of the imposing of the force of the crossbar spring 63, is moved counter to the direction of the arrow 64, by which the thus carried hook 60 engages itself into the complementary shaped hook 63 of the lever arm 224. The components of this fold-up mechanism, which, upon the swinging of the headrests simultaneously activate a related motion to the impact cushion 8, are assembled in a hollow space within the impact cushion 8. For the final positioning of the in-use, unused positions of the impact cushion 8 in the hollow space 65, elastomer bodies 249, 250 with their detent surfaces 247, 248 have been provided. The detent surfaces 247, 248 coact with the side edges of the extended piece 55 meeting the holder 56.

While preferred embodiments have been shown and described, those skilled in the art will recognize that changes and modifications may be made to the foregoing examples without departing from the scope and spirit of the invention. For example, specific geometrics and dimensions of various elements of the described embodiments and materials used for those embodiments may be altered to suit particular applications. It is thus intended to claim all such changes and modifications as fall within the scope of the appended claims and their equivalents.

The invention claimed is:

1. A headrest for a vehicle seat, the headrest comprising:
   an impact cushion attached to the vehicle seat;
   a pivotal axle extending transversely to a direction of travel of the vehicle, the pivotal axle enabling a rotation against an action of a spring of the headrest into a used or an unused, lockable position,
   at least a portion of the pivotal axle secured against rotation of itself in relation to the vehicle seat,
   a toggle linkage installed in the impact cushion, the toggle linkage assembled from a plurality of pivotal lever arms bound together by a knee joint in a plane extending transversely to the pivotal axle,
   a distanced first end of the toggle linkage disposed radially in relation to the pivotal axle and turnably carried on a lever arm axle stationary in respect to the impact cushion, and a positioning element placed in the impact cushion for the locking of the used position of the headrest, wherein the toggle linkage maintains in the used position a torque restriction between the impact cushion and the pivotal axle, whereby the location of the lever arms are fixed in relation to one another.

2. A headrest in accord with claim 1, wherein the lever arms of the toggle linkage in a fully extended portion define an angle ($\alpha$)>180° by their sides, the sides facing away from a toggle swing zone and wherein the positioning element is configured to change the position of the lever arms to an angle ($\alpha$)<180°.

3. A headrest in accord with claim 2, wherein the positioning element defines an abutment, the abutment disposed on a side of the toggle linkage remote from the toggle swing zone, wherein the said abutment is movably set in bearings and serves as a release element.

4. A headrest in accord with claim 3, wherein the abutment includes a guided, movable crossbar disposed in the impact cushion transversely to the vehicle travel direction wherein the crossbar defines an angled end surface that coacts in a wedgelike movement with an adjacent, complementarily angled surface of a lever arm.

5. A headrest in accord with claim 2, further comprising a pawl connected to a second end of the toggle linkage the pawl rotatable about a stationary axle disposed in a transverse direction to a longitudinal axis of the vehicle within the impact cushion, the pawl configured to rotate pivotally between positions for blockage or for release, whereby in the blockage position a torque closure is effected between the pawl and the pivotal axle and in the released position, the closure is made free.

6. A headrest in accord with claim 5, further comprising a cam depending from a circumferential surface of the pivotal axle, wherein a side of the pawl proximal to the pivotal axle defines a recess the cam engageable in the recess in the blockage position.

7. A headrest in accord with claim 2, further comprising a link extending from the pivotal axle, the second end of the toggle linkage is turnably affixed on the link.

8. A headrest in accord with claim 1, wherein the toggle linkage defines an angular position less than fully extended, the lever arms defining by their sides remote from the toggle swing zone an angle ($\alpha$)<180°.

9. A headrest in accord with claim 8, wherein the positioning element defines an abutment disposed in the toggle swing zone to coact with at least one of the lever arms in an area of the toggle linkage the toggle linkage displaceable by the abutment out of the path of the lever arms for the unlocking of the used position of the headrest.

10. A headrest in accord with claim 9, wherein the abutment is a pawl extending into the toggle swing zone of the toggle linkage, the pawl defining a first end and a second free end, the first end pivotal on an axle between a locked and a freed position, the free end further defining a hook engageable in a complementary hook located on at least one lever arm proximate of the toggle linkage, the pawl in the freed position releasing the hook and places itself outside of the toggle swing zone.

11. A headrest in accord with claim 1, further comprising a spring, the toggle linkage urged by the spring to maintain the torque restriction between the impact cushion and the pivotal axle.

12. A headrest in accord with claim 1, wherein the pivotal axle consists of two mutually movable components, the two components respectively extending laterally beyond the impact cushion, wherein, against the action of a spring, an outward projection of at least one of the components is minimized from the impact cushion.

13. A headrest in accord with claim 12, wherein the spring is a helical spring, the spring circumferentially and axially encompassing a least a portion of the pivotal axle.

14. A headrest in accord with claim 13, wherein the helical spring is configured to hold the headrest in its unused position.

* * * * *